United States Patent [19]

Cerruti et al.

[11] 4,043,355
[45] Aug. 23, 1977

[54] COMBINED FLOW MEASURING AND VALVE LEAKAGE INDICATOR

[75] Inventors: Roger Anthony Cerruti; Thomas Ellsworth McWhorter, both of Whitehall; David Russell Ruprecht, Laurys Station, all of Pa.

[73] Assignee: Air Products and Chemicals, Inc., Allentown, Pa.

[21] Appl. No.: 698,625

[22] Filed: June 22, 1976

[51] Int. Cl.² .............................................. G01M 3/28
[52] U.S. Cl. ................................ 137/312; 73/40.5 R; 137/557
[58] Field of Search ....................... 137/312, 551, 557; 73/40.5 R, 46

[56] References Cited
U.S. PATENT DOCUMENTS

| | | | |
|---|---|---|---|
| 2,430,122 | 11/1947 | Grace | 137/551 |
| 3,398,761 | 8/1968 | Grove et al. | 137/312 |
| 3,511,082 | 5/1970 | Lathrop et al. | 73/46 |
| 3,664,357 | 5/1972 | Kreiss | 73/40.5 R X |

Primary Examiner—Martin P. Schwadron
Assistant Examiner—Richard Gerard
Attorney, Agent, or Firm—Barry Moyerman; James C. Simmons

[57] ABSTRACT

Apparatus for detecting fluid leakage past a control valve in a system for controlling and measuring the flow of a fluid in a conduit of the type having first and second control valves, a flow sensing element of the differential pressure type located in the conduit between the control valves and a differential pressure flow rate indicator connected to the flow sensing element through high and low pressure conduits. Fluid leakage past the control valve discharges from the isolated portion of the fluid conduit first through the low pressure conduit and then through a vent conduit causing a pressure drop along the low pressure conduit which causes an indication of flow on the flow rate indicator.

6 Claims, 1 Drawing Figure

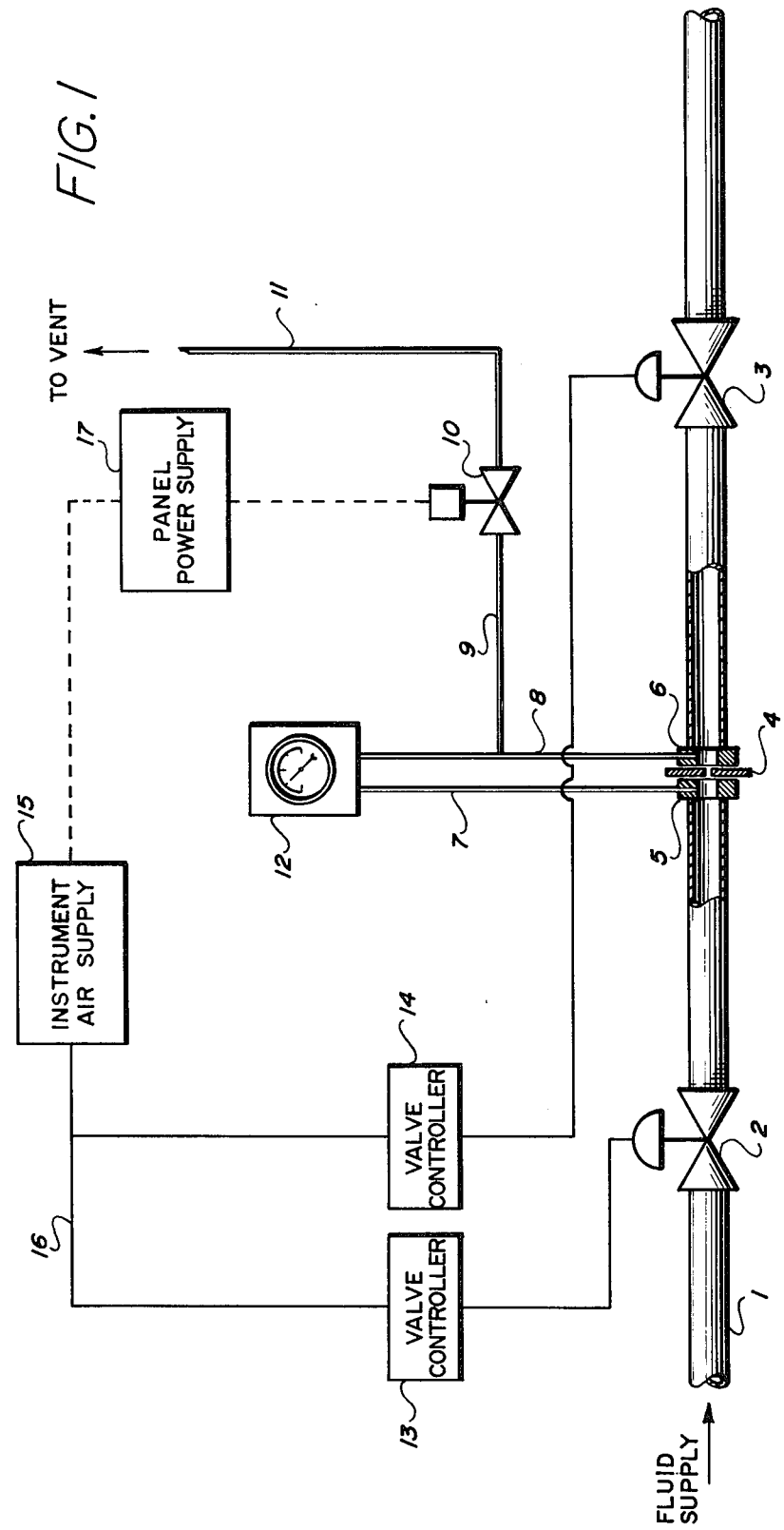

COMBINED FLOW MEASURING AND VALVE LEAKAGE INDICATOR

BACKGROUND OF THE INVENTION

This invention relates to an apparatus for measuring and controlling the flow rate of a fluid in a conduit of the type having first and second control valves in the conduit with a flow sensing element of the differential pressure type located in the conduit between the control valves. A flow rate indicating means is connected to the flow sensing element through high pressure and low pressure conduits and includes apparatus for detecting and indicating fluid leakage past a valve into the isolated portion of the fluid conduit between the control valves.

Fluid flow measuring and controlling apparatus are commonly used in a diversity of applications ranging from the control and measurement of the flow rate of cryogenic liquids to the control and measurement of the flow rate of high temperature gases, and in some cases, supercritical fluids. In certain of these applications, it is highly desirable for safety or process reasons to be able to insure positive shut-off of the fluid at the control valves and to have a positive indication of any leakage past the valves. Such conditions occur in applications involving the use of toxic or highly reactive fluids, or those where leakage of the fluid past the shut-off valve would create hazardous conditions or would damage equipment or materials downstream of the flow measuring and controlling equipment. Examples of such applications include the supply of oxygen or other gases to various processes; the supply of steam to reactions; or the supply of various reactants to a reaction vessel. A specific example of the application of this invention is to the control and measurement of the supply of oxygen gas for enrichment of air used in cupola furnaces.

In the prior art, fluid leakage past the first control valve when both the first and second valve are in shut-off position has been detected by means of a vent conduit communicating directly with the fluid conduit at a point between the first and second control valves through which the leakage fluid discharged. Such vent conduits included valves opened manually or in response to a signal from a remote location. In other applications the vent conduit included a pressure relief valve which opened to discharge the leakage fluid when the pressure in the fluid conduit between the first and second control valves exceeded a predetermined pressure, generally higher than the normal working pressure of the fluid downstream of the first shut-off valve. Detection of the leakage was accomplished by inclusion of a flow indicator in the vent conduit on the discharge side of the valve. Alternatively, a remote alarm would be actuated by the opening of a relief valve. A further method disclosed by the prior art of detecting leakage past the valve seats of a shut-off valve is disclosed in U.S. Pat. No. 2,430,122, wherein an extraneous fluid is admitted to the body of the valve between the upstream and downstream valve seats and any leakage past the valve seats is detected by flow of the extraneous fluids through the supply conduit.

In order to provide a positive indication of leakage past the first valve in prior art flow measuring and controlling apparatus, connection of a vent conduit to the fluid conduit in addition to the flow measuring apparatus between the first and second valves is required. A second flow indicator, such as a rotameter, was also required on the vent conduit in addition to the flow rate indicator connected to the flow sensing element in the fluid conduit. Often the flow rate indicator is located remotely from the fluid conduit at a control panel. In the prior art, the separate vent conduit involved significant additional cost in installing such vent conduit to the control panel where the leakage indicator was located, as well as the cost attendant with a second flow indicator.

SUMMARY OF THE INVENTION

We have discovered that in an apparatus for measuring and controlling the flow rate of a fluid utilizing a differential pressure type of flow measuring system between two control valves in a fluid conduit, a positive indication of leakage of small amounts of fluid past the first control valve into the isolated portion of the fluid conduit when both control valves are in shut-off position can be realized by connecting a vent conduit in communication with the low pressure conduit of the flow measuring system at a point between the flow rate indicator and the flow sensing element in the fluid conduit. The point of connection of the vent conduit to the low pressure conduit is preferably in close proximity to the flow rate indicator. The vent conduit includes a valve closed to block the vent conduit during the time when the first and second control valves are open allowing normal fluid flow through the fluid conduit. Upon closing of the control valves, the vent valve is opened to allow discharge of any leakage fluid from the fluid conduit through the low pressure conduit and the vent conduit. Fluid leaking past the first control valve creates an increase in pressure in the portion of the fluid conduit isolated by the control valves. With no flow through the high pressure conduit, this pressure is transmitted undiminished to the high pressure connection of the flow rate indicator. Discharge of the leakage fluid from the fluid conduit through the low pressure conduit and through the vent conduit creates a pressure drop between the point of connection of the low pressure conduit to the flow sensing element and the junction with the vent conduit. This reduced pressure is communicated to the flow rate indicator through the low pressure conduit between the points of connection of the low pressure conduit to the vent conduit and the flow rate indicator, thus causing a positive indication of flow on the flow rate indicator. The leakage fluid is discharged from the vent conduit at a safe location.

Operation of the vent valve may be manual or may be accomplished automatically in response to closing of the first control valve.

The present invention offers a significant improvement over the prior art in that venting of fluid in the conduit between the first and second control valves, and indication of leakage past the first valve is accomplished with the flow rate indicator installed in the system to measure the normal flow in the conduit. Where the flow rate indicator and means for actuating the control valves are located remotely from the fluid conduit, the present invention eliminates the need for a vent conduit extending from the fluid conduit to the control panel and the installation in the control panel of an additional flow indicator in the vent conduit. A further advantage of the present invention over the prior art is the utilization of a single flow indicator for both measuring fluid flow in the conduit during a normal operation and indicating the presence of leakage past the first control valve during the period the first and second control valves are in shut-off position. This advantage is most appreciated when operation of the fluid supply system is generally unattended and a recording type fluid flow rate indicator is installed. In such applications, the recording flow rate indicator will provide a graphic recording of any fluid leakage during unattended operation. To provide such capability, the prior art sould require the installation of an additional expensive flow rate recorder.

Therefore, it is an object of this invention to provide a combined flow measuring and valve leakage indicator wherein a flow rate indicator of the differential pressure type is utilized to measure fluid flow in a conduit and to detect leakage past a control valve upstream of a flow sensing element when such control valve is in a closed position.

A further object of this invention is to provide a means for automatically venting the isolated portion of the fluid conduit between the first and second control valves and to automatically indicate leakage of small volumes of fluid past the first control valve.

A still further object of the invention is to provide means for indicating positive shut-off of the fluid in the fluid conduit at the first control valve.

BRIEF DESCRIPTION OF THE DRAWING

FIG. 1 is a diagrammatic view of a preferred embodiment of the invention.

DETAILED DESCRIPTION OF THE PREFERRED EMBODIMENTS

FIG. 1 illustrates diagrammatically a preferred embodiment of the present invention. A fluid conduit 1 includes a first control valve 2, a second control valve 3, and a flow sensing element 4 of the differential pressure type shown as an orifice element located in fluid conduit 1 between control valves 2 and 3. A flow rate indicator 12 of the recording differential pressure type, such as the Model 202A Flow Recorder manufactured by ITT Barton, communicates with fluid conduit 1 through high pressure conduit 7 and low pressure conduit 8, which are connected to flange taps 5 and 6, respectively, on either side of flow sensing element 4. Pressure conduits 7 and 8 are generally constructed of a tubing material compatible with the fluid and having a nominal diameter of from ⅛ to 1 inch. A preferred material for use in oxygen service is copper tubing of ¼ inch nominal diameter. Connected to and communicating with the low pressure conduit 8 at a point between flange tap 6 of flow sensing element 4 and the flow indicating recorder 12, is a vent conduit 9 terminating at a vent valve 10. Vent conduit 11 extends from vent valve 10 to a remote location where any leakage fluid can be safely discharged. Advantageously, vent conduits 9 and 11 are constructed of materials similar to low pressure conduit 8.

In the preferred embodiment, valve 10 is a solenoid valve of the normally open type manufactured by Asco Valves and described in ASCO Bulletin 8263. In operation, the solenoid coil of this valve is electrically energized by the control panel power supply 17, thus closing vent valve 10 during flow of fluid through conduit 1 and open control valves 2 and 3. Interruption of the panel power supply 17 deenergizes instrument air supply 15 causing valve controllers 13 and 14 to close control valves 2 and 3, thus shutting off the flow of fluid in conduit 1. Simultaneously, vent valve 10 opens allowing any fluid pressure in the isolated portion of fluid conduit 1 between control valves 2 and 3 to discharge through low pressure conduit 8 and vent conduits 9 and 11. While in the preferred embodiment, vent valve 10 is electrically energized through the panel power supply, there exist alternative arrangements for actuation of vent valve 10. These include actuation by means of the instrument air supply 15 by suitable connection of vent valve 10 to instrument air supply manifold 16.

The instrument air supply 15 is shown in the preferred embodiment of FIG. 1 to be energized by the panel power supply. Advantageously, a supply of instrument air may be admitted to the instrument air supply manifold 16 through a solenoid valve (not shown) of the normally closed type. In such case, interruption of the panel power supply, for example, through a switch (not shown) for shutting off fluid supply will close the instrument air supply solenoid valve thus causing valve controllers 13 and 14 to close control valves 2 and 3.

Flow sensing element 4 is shown in FIG. 1 of the preferred embodiment as an orifice plate with upstream and downstream flange pressure taps. However, other flow sensing elements of the differential pressure type such as venturi or pitot elements can be used. For example, a pitot type flow sensor is manufactured by the Ellison Instrument Division of Dieterich Standard Corp. of Boulder, Colo., and sold under the Annubar trademark. A necessary requirement for the use of such flow sensing elements is that there exist direct high and low pressure connections between the flow sensing element and the flow indicator.

Flow rate indicator 12 communicates with the high and low pressure taps of the flow sensing element through conduits 7 and 8 respectively. Flow rate indicator 12 may be a gauge type instrument or, advantageously, a recording type instrument. The use of a recording type flow rate indicator provides a graphic record of the fluid flow rate in conduit 1 during normal flow and permanent graphic indication of any leakage past the first of control valves 2 and 3 during the time such control valves are in the closed position, and vent valve 10 is open.

In the preferred embodiment, fluid conduit 1 generally ranges in diameter from ½ inch nominal diameter upwards. Pressure conduits 7 and 8 and vent conduits 9 and 11 are generally constructed of tubing or pipe with a nominal diameter between ⅛ and 1 inch, with a common range being ⅛ through ½ inch nominal diameter. Utilizing common construction materials, the cross-sectional flow area of low pressure conduit 8 ranges generally from 10% to less than 0.2% of the cross-sectional flow area of fluid conduit 1.

While the location of fluid conduit 1 containing control valves 2 and 3 and flow sensing element 4 is generally determined with regard to the location of the fluid supply system (flow direction indicated by arrow in FIG. 1) upstream of control valve 2 and the use point downstream of control valve 3, the flow indicator 12, panel power supply 17, instrument air supply 15, valve controllers 13 and 14 and vent valve 10 are advantageously located within a single control panel located at the point of maximum convenience and safety for the operator. The control panel may be located within a few feet of flow sensing element 4 or may be located remotely by a distance of 100 feet or more. Thus, pressure conduits 7 and 8 will range generally in length from about 2 feet to 200 feet. Vent conduit 9 is connected to the low pressure conduit 8 advantageously at a point near flow indicator 12 within the control panel assembly. Vent valve 10, similarly, is preferably located within the control panel assembly so as to provide for fabrication, operation, and maintenance efficiencies. Vent conduit 11 connects vent valve 10 with a discharge region into which any fluid leaking past control valve 2 is safely discharged. In the case of atmospheric gases such as oxygen or nitrogen, such discharge can be to the atmosphere at a location where the gases will be safely dispersed. Where the fluid in conduit 1 is toxic or normally a liquid, vent conduit 11 should discharge to adequate facilities for safely handling the maximum expected volume of discharging fluid.

Operation of the apparatus is as follows:

During normal fluid flow through conduit 1, control valves 2 and 3 are maintained in open position by valve controllers 13 and 14. Control of valves 2 and 3 may be in response to pressure or flow rate in conduit 1 or other control parameter, and can be accomplished by any number of means well known in the art. In the preferred embodiment as shown in FIG. 1, fluid flow through conduit 1 is shut-off by interrupting the panel power supply 17 by means of a switch. Interruption of the panel power supply, in turn, interrupts the instrument air supply to valve controllers 13 and 14 through manifold 16. Upon loss of instrument air, valve controllers 13 and 14 close control valves 2 and 3. In one preferred embodiment of the apparatus, valve controller 14 operates in a manner to delay final closing of valve 3 for a period of time after the closing of control valve 2. This delay allows fluid in the portion of conduit 1 between control valves 2 and 3 to initially discharge through the downstream portion of conduit 1, reducing the time required to equalize pressure in the isolated portion of conduit 1 with the ambient pressure existing at the discharge end of vent conduit 11. At the same time that power to the instrument air supply is interrupted, power to the solenoid of vent valve 10 is interrupted, causing vent valve 10 to open. During a brief period of time, residual fluid contained in the isolated portion of fluid conduit 1 between control valves 2 and 3 will discharge through the low pressure conduit 8, thence through vent conduit 9, vent valve 10, and finally vent 11 to atmosphere. If no leakage past control valve 2 exists, pressure in the isolated portion of the fluid conduit 1 will equalize with the pressure at the discharge end of vent conduit 11 and no flow will take place through low pressure conduit 8. In this instance, the pressure communicated to the flow indicator by high pressure conduit 7 will be equal to that existing at the point of connection of low pressure conduit 8 and vent conduit 9 and communicated to the low pressure side of the flow indicator by low pressure conduit 8, thus causing the flow indicator to register an absence of flow. If, during the period control valves 2 and 3 are in closed position, fluid leaks past control valve 2, such leaking fluid will cause an increase in pressure in the isolated portion of fluid conduit 1 causing a flow of the leakage fluid through low pressure conduit 8, vent conduit 9, vent valve 10, and finally vent conduit 11 to discharge. The pressure of the fluid in the isolated portion of the fluid conduit 1 will be communicated to the high pressure side of flow indicator 12 by high pressure conduit 7. Since no flow will exist through high pressure conduit 7, this pressure will be transmitted undiminished to flow indicator 12. Flow of the leakage fluid through low pressure conduit 8 will cause a pressure drop between the point of connection of low pressure conduit 8 to the fluid conduit at 6 and the point of connection of vent conduit 9 to the low pressure conduit 8, resulting in an intermediate pressure. A further pressure drop will occur through vent conduits 9 and 11 with the pressure at the discharge of vent conduit 11 being equal to that existing in the discharge region. Since no flow will exist in the portion of low pressure conduit 8 between the point of connection with vent conduit 9 and the flow rate indicator 12, the intermediate pressure existing at the connection of low pressure conduit 8 and vent conduit 9 will be transmitted undiminished to the low pressure side of flow rate indicator 12. The difference between the pressure existing in the isolated portion of fluid conduit 1 and the intermediate pressure transmitted to the low pressure side of the flow rate indicator 12 will cause a positive reading on the flow rate indicator, indicating the presence of leakage past contol valve 2.

In practice, it will be noted that sensitivity of the flow indicator to the flow of leakage fluid through low pressure conduit 8 increases with increasing length of low pressure conduit 8 between the point of connection with fluid conduit 1 and vent conduit 9, and with decreasing diameter of low pressure conduit 8. If it is desirable, the length of low pressure conduit 8 between the fluid conduit 1 and the connection with vent conduit 9 and the flow diameter of low pressure conduit 8 may be selected utilizing customary fluid flow design principles such that at a predetermined leakage flow rate, the pressure drop along low pressure conduit 8 from the point of connection with fluid conduit 1 to the point of connection with vent conduit 9 corresponds to the full scale pressure differential of the flow rate indicator 12. Such commonly used ranges are 10, 20 and 40 inches of water. An alternative method of controlling the pressure drop along low pressure conduit 8 consists of installing a fldow resistance device in low pressure conduit 8 between flange taps 6 and the junction with vent conduit 9. Such flow resistance devices include instrument gauge snubbers, orifices, or valves.

While the system has been described as detecting leakage past the first control valve, it is to be understood that the apparatus will operate to give a positive indication of leakage past either the upstream or downstream control valves into the isolated portion of the fluid conduit. Such leakage past the downstream valve may occur when the system pressure downstream of the flow measuring apparatus is maintained at a pressure higher than that of the region to which vent conduit 11 discharges.

Having thus described our invention, we claim as our invention:

1. In an apparatus for controlling and measuring the flow rate of a fluid in a conduit of the type having first and second flow control valves with a flow sensing device of the differential pressure type located in the conduit between the control valves and flow indicating means of the differential pressure type connected to said flow sensing device through a high pressure conduit and a low pressure conduit, the improvement for detecting fluid leakage past the control valves into the conduit between the control valves when said first and second valves are in closed position comprising:

a vent conduit communicating with said low pressure conduit at a point between the connection of the low pressure conduit to the flow sensing device and the point of connection of the low pressure conduit to the flow indicating means;

said vent conduit discharging through a vent valve normally closed during fluid flow through said fluid conduit; and means to open said vent valve in response to closing of said control valves, whereby fluid leakage past said control valves into the fluid conduit between said control valves discharges through the low pressure conduit causing a pressure drop between the point of connection of the low pressure conduit to the flow sensing means and the point of connection of the low pressure conduit to the vent conduit, said pressure drop causing a positive indication of flow on said flow indicating means.

2. The apparatus of claim 1 wherein said vent valve is automatically opened by means in response to closing of said control valves.

3. The apparatus of claim 1 including means to open said vent valve and to close said first and second control valves upon interruption of electrical power.

4. The apparatus of claim 1 including means to open said vent valve upon interruption of a supply of working fluid pressure, said first and second valves closing upon interruption of such working fluid pressure.

5. The apparatus of claim 1 wherein said fluid is a gas.

6. The apparatus of claim 1 wherein the ratio of the cross-sectional flow area of the vent conduit to the cross-section flow area of the fluid conduit is between 0.10 and 0.002 and the distance between the points of connection of the low pressure conduit to the flow sensing device and the low pressure conduit is between 2 and 200 feet.

* * * * *